W. D. GUSEMAN.
Fireplace.
No. 2,934.
Reissued May 19, 1868.
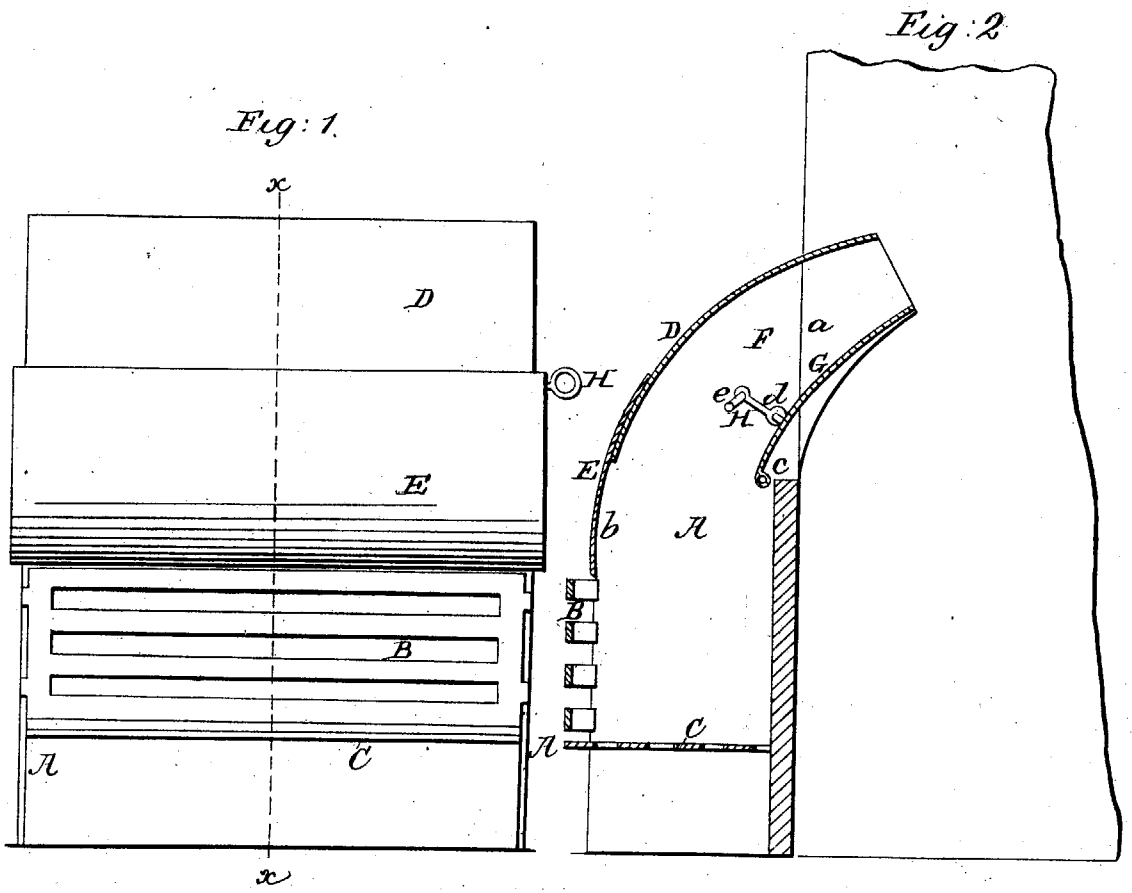
Witnesses.
J. W. Coombs
G. W. Reed
Inventor
W. D. Guseman
per Munn & Co
attorneys
N. PETERS, Photo-Lithographer, Washington, D. C.

United States Patent Office.

W. D. GUSEMAN, OF MORGANTOWN, WEST VIRGINIA.

*Letters Patent No.* 39,043, *dated June* 30, 1863; *reissue No.* 2,934, *dated May* 19, 1868.

IMPROVEMENT IN FIREPLACES.

The Schedule referred to in these Letters Patent and making part of the same.

TO ALL WHOM IT MAY CONCERN:

Be it known that I, W. D. GUSEMAN, of Morgantown, in the county of Monongalia, and State of West Virginia, have invented a new and improved Fire-Grate; and I do hereby declare that the following is a full, clear, and exact description thereof, which will enable others skilled in the art to make and use the same, reference being had to the accompanying drawings, forming part of this specification, in which—

Figure 1 is a front view of my invention.

Figure 2, a vertical section of the same, taken in the line *x x*, fig. 1.

Similar letters of reference indicate corresponding parts in the several figures.

The object of this invention is to construct a fire-grate in such a manner that a greater heat-radiating surface than usual will be exposed, and consequently a saving in fuel effected.

To enable those skilled in the art to fully understand and construct my invention, I will proceed to describe it.

A A represent the two side-pieces of the grate, the upper parts, *a*, of which are of curved form, as shown in fig. 2. These side-pieces may be of sheet-metal plate or of cast metal, and a front grate, B, is secured to the front edges of the side-pieces A A, and a bottom grate, C, fitted between the side-pieces at the lower edge of the grate B.

To the front edges of the upper part of the side-pieces A A there is attached a curved plate, D, which does not extend down to the grate B, a space, *b*, being allowed between them, as shown in fig. 2.

On the curved plate D there is fitted a curved plate or blower, E, the ends of which lap over the edges of the plate D. This plate or blower E is allowed to slide freely up and down, and it may be constructed of sheet or cast metal, or of wire gauze. When constructed of plate, it serves, when down so as to close the opening or space *b*, as a blower, and when constructed of wire gauze, it serves as a screen to prevent coals from falling off from the fire.

In the back part of the flue F, which is formed by the upper curved parts *a a* of the side-pieces A A, there is placed a damper, G, the lower edge of which is pivoted in the side-pieces, as shown at *c*, and this damper is connected by two rods, *d*, to cranks, *e*, on a shaft, H, which passes horizontally through the side-pieces A A. By turning this shaft H, the damper G may be adjusted so as to enlarge or contract the orifice of the flue F, as will be fully understood by referring to fig. 2.

The fire-grate is placed against the chimney, the flue at its upper end passing into the chimney, (see fig. 2,) in which the red vertical line shows the front of the chimney.

From the above description, it will be seen that the whole of the grate is in front of the chimney, and the heat will be radiated from the side-pieces A A and from the curved front plate D, as well as from the front edge of the grate B.

In kindling a fire, the damper G is adjusted or thrown back in order to obtain as great a draught as possible, and when the fire is under way the damper may be raised in order to contract the flue-orifice, and thereby check the draught, and also throw the heat forward into the apartment.

The whole device may be constructed at a moderate expense, and it will effect a great saving in fuel, for it is well known that with the ordinary grates which are set in the chimney, a large proportion of the heat is lost as it passes up the chimney.

I would remark that the blower or screen E may be raised and lowered by any proper means. It may simply have a knob attached to it, or a crank-shaft may be applied similar to that shown for adjusting the damper G.

Having thus described my invention, what I claim as new, and desire to secure by Letters Patent, is—

1. The curved sliding blower E, in combination with the curved plate D and grate B, arranged to project in front of the chimney, as herein described, for the purpose specified.

2. The damper, in combination with the flue, sliding blower, or screen and grate, all arranged substantially in the manner as and for the purpose set forth.

The above specification of my invention signed by me, this 1st day of February, 1868.

W. D. GUSEMAN.

Witnesses:

WM. F. MCNAMARA,

ALEX. F. ROBERTS.